(12) United States Patent
Crisan et al.

(10) Patent No.: US 12,455,468 B2
(45) Date of Patent: Oct. 28, 2025

(54) ELECTRO-OPTICAL DISPLAY MODULE WHICH HAS TWO INTERCONNECTED ELEMENTS

(71) Applicant: Continental Automotive Technologies GmbH, Hannover (DE)

(72) Inventors: Daniel Crisan, Timisoara (RO); Marius-Andrei Muntean, Timisoara (RO)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 236 days.

(21) Appl. No.: 18/266,042

(22) PCT Filed: Dec. 2, 2021

(86) PCT No.: PCT/DE2021/200232
§ 371 (c)(1),
(2) Date: Jun. 8, 2023

(87) PCT Pub. No.: WO2022/122094
PCT Pub. Date: Jun. 16, 2022

(65) Prior Publication Data
US 2024/0027808 A1  Jan. 25, 2024

(30) Foreign Application Priority Data
Dec. 8, 2020 (EP) ...................................... 20465594
Dec. 14, 2020 (DE) ......................... 102020215822.3

(51) Int. Cl.
*G02F 1/1333* (2006.01)

(52) U.S. Cl.
CPC .. *G02F 1/133314* (2021.01); *G02F 1/133317* (2021.01); *G02F 1/133325* (2021.01)

(58) Field of Classification Search
CPC ......... G02F 1/133314; G02F 1/133317; G02F 1/133325; G06F 3/0446; G06F 3/0412;
(Continued)

(56) References Cited

U.S. PATENT DOCUMENTS 5,348,686 A * 9/1994 Vyas ...................... C08K 13/04
252/514
6,243,259 B1   6/2001 Yamakawa et al.
(Continued)

FOREIGN PATENT DOCUMENTS

CN    1207012 A    2/1999
CN    1808125 A    7/2006
(Continued)

OTHER PUBLICATIONS

Office Action dated Jun. 26, 2024 from corresponding Korean patent application No. 10-2023-7016103.
(Continued)

*Primary Examiner* — Allen L Parker
*Assistant Examiner* — Dakota M Talbert
(74) *Attorney, Agent, or Firm* — Buchanan Ingersoll & Rooney PC

(57) ABSTRACT

An electrooptical display module comprises an electrooptical display, a first element and a second element. The first element and the second element are connected together and the first element carries the electrooptical display. The first element and the second element are connected by at least one silicone body. In a method for producing an electrooptical display module, silicone is dispensed on at least one of a first element and a second element and then the first element and the second element are brought together so that the silicone connects the first element with the second element and waiting is undertaken until the silicone is set and so a silicone body is formed.

16 Claims, 3 Drawing Sheets

(58) Field of Classification Search
CPC ........ G06F 2203/04111; G06F 13/409; H02M 7/003
See application file for complete search history.

(56) References Cited

U.S. PATENT DOCUMENTS

| | | | |
|---|---|---|---|
| 6,675,470 B2* | 1/2004 | Muramatsu | H05K 3/365 349/149 |
| 2006/0121757 A1 | 6/2006 | Chung et al. | |
| 2009/0021558 A1 | 1/2009 | Hiwada | |
| 2013/0070401 A1 | 3/2013 | Arheit | |
| 2018/0081392 A1 | 3/2018 | Kweon et al. | |
| 2020/0183454 A1 | 6/2020 | Hung et al. | |
| 2020/0201107 A1* | 6/2020 | Takaira | G02B 6/0088 |

FOREIGN PATENT DOCUMENTS

| | | |
|---|---|---|
| CN | 101352964 A | 1/2009 |
| CN | 202677020 U | 1/2013 |
| CN | 106773200 A | 5/2017 |
| CN | 107845332 A | 3/2018 |
| CN | 208721957 U | 4/2019 |
| CN | 110703481 A | 1/2020 |
| CN | 110827687 A | 2/2020 |
| DE | 2726851 A1 | 12/1978 |
| DE | 102008041830 A1 | 6/2010 |
| DE | 102010046874 A1 | 12/2011 |
| DE | 102014210345 A1 | 12/2015 |
| DE | 102018007427 A1 | 10/2019 |
| EP | 1956401 A2 | 8/2008 |
| EP | 2197240 B1 | 9/2016 |
| JP | 2014137458 A | 7/2014 |
| JP | 2014178552 A | 9/2014 |
| JP | 2019101343 A | 6/2019 |
| KR | 20160067304 A | 6/2016 |
| KR | 20170050707 A | 5/2017 |

OTHER PUBLICATIONS

Search Report dated Jul. 13, 2021 from corresponding German patent application No. 10 2020 215 822.3.

International Search Report and Written Opinion dated Mar. 10, 2022 from corresponding International patent application No. PCT/DE2021/200232.

Office Action (The First Office Action) issued Apr. 9, 2025, by the State Intellectual Property Office of People's Republic of China in corresponding Chinese Patent Application No. 202180079331.7 and an English translation of the Office Action. (20 pages).

Written Decision on Registration dispatched on Mar. 25, 2025 from corresponding Korean patent application No. 10-2023-7016103.

* cited by examiner

ELECTRO-OPTICAL DISPLAY MODULE WHICH HAS TWO INTERCONNECTED ELEMENTS

CROSS REFERENCE TO RELATED APPLICATIONS

This U.S. patent application claims the benefit of PCT patent application No. PCT/DE2021/200232, filed Dec. 2, 2021, which claims the benefit of German patent application No. 10 2020 215 822.3, filed Dec. 14, 2020, and European patent application No. 20465594.8, filed Dec. 8, 2020, all three of which are hereby incorporated by reference.

TECHNICAL FIELD

The present disclosure refers to an electrooptical display module comprising two elements connected together and comprising an electrooptical display.

BACKGROUND

Such electrooptical display modules are known for example from displays used in vehicles for displaying information to the driver and/or passengers of the vehicle. Known electrooptical display modules comprise a first element connected to a second element by connecting elements. These connecting elements provide a force to the elements which may be transmitted to the electrooptical display, which may be a liquid crystal display (LCD). Known connection devices comprise for example EMC gaskets. These EMC gaskets create a pressure on the first element and the second element and affect the black uniformity of the display if LCD displays are used. These known EMC gaskets furthermore require the use of additional clips and/or screws before the mounting of the display device is finished. The task of the present disclosure is to provide a display device in which the black uniformity of the display is not influenced and the assembly of the display module is enhanced.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one embodiment, "the first element carrying the electrooptical display" means that the electrooptical display is connected directly to the first element or via one additional element or more additional elements between them.

Since the first element and the second element are connected by at least one silicone body the connection between the first and second element does not create itself a force impacting the electrooptical display. Furthermore, the assembly is simplified since the silicone may be dispensed by dispensing machines or manually by a silicone press and no complex manual assembly is required, which might result in defective mounting. The first element may be for example a backplate of the electrooptical display module or a frame, the second element may be for example the backplate of the electrooptical display module or a carrier of a printed circuit board.

In an embodiment, if the first element and the second element are made of metal, the display module is very stable and able to provide a good thermal management by leading heat to an external environment of the electrooptical display module.

In an embodiment, if the at least one silicone body is made of electrically conductive silicone, a good and long-lasting electrical connection between the first element and second element may be reached. This might be useful for electrical grounding of the electrooptical display module.

In an embodiment, if the first element is a backplate of the electrooptical display and the second element is a carrier of a printed circuit board, a good electrical connection may be provided by the silicone if an electrically conductive silicone is used.

In an embodiment, if the carrier and the backplate respectively comprise a first sector and these sectors face each other and provide a space between them, this space is the ideal place to be filled with the silicone, especially with the electrically conductive silicone. This is done for example by dispensing the silicone on the first sector of the first element and/or dispensing the silicone on the first sector of the second element before the first and second element are brought together in their final position.

In an embodiment, if the first sectors are planar, a good shape for the space and the resulting silicone body may be achieved.

In an embodiment, if the sectors are parallel to each other, the body of the electrically conductive silicone may produce a stable, partially elastic connection between the frame and the carrier and so forces between them are only transmitted in a reduced form so that the impacts on the electrooptical display are further reduced.

In an embodiment, if the carrier and the backplate comprise respectively a second section and these sections are in direct mechanical contact with each other, the space between the first sectors is determined and no further assembling tool for adjusting the right distance between the first sectors is required if the silicone is not able to hold the distance between the parts to be connected before the silicone is set.

In an embodiment, if the first element is a frame carrying the electrooptical display and the second element is a backplate of the electrooptical display, otherwise required rubber elements between the frame carrying the electrooptical display and the backplate may be replaced by the silicone bodies. These silicone bodies have two functions: connecting the two elements and damping the two elements at the same time.

In an embodiment, an ideal shape of the backplate is rectangular, but other shapes are also possible.

In an embodiment, if in each of the corners of the backplate is arranged a silicone body connecting the backplate with the frame, a working and long-lasting connection is achieved.

In an embodiment, if the backplate comprises a channel filled with the silicone, a hermetic sealing against dust and moisture may be achieved if the channel forms a closed loop filled with the silicone and the frame touches the resulting silicone body.

In an embodiment, a silicone body is additionally able to fix a lightguide.

In a method for producing an electrooptical display module with the features described above, first the silicone is dispensed on the first element and/or the second element and then the first element and the second element are brought together so that the silicone connects the first element with the second element and then waiting is undertaken until the silicone is set, creating the silicone body. If the silicone is an electrically conductive silicone, an electrical connection between the first element and the second element is provided too.

The electrically conductive silicone may be dispensed on the first sectors of the first element, e.g. the backplate, and/or the first sectors of the second element, e.g. the carrier, then the first element and the second element are positioned in a manner such that the first sectors of the first element and the first sectors of the second element form a space between them so that this space is filled with the silicone, e.g. the electrically conductive silicone, dispensed beforehand on the first sectors of the first element and/or the first sectors of the second element.

According to the viscosity of the silicone, especially the electrically conductive silicone, and the weight of one element, e.g. the second element, laid on the other element, e.g. the first element, additional tools or second sectors are not required to hold the two elements at a desired distance from each other if the viscosity of the silicone is sufficiently high so that the silicone does not flow away before it is set.

In an embodiment, if a backplate shall be connected to a frame, the silicone is dispensed on the backplate in an amount going beyond the rim of the backplate. Then the frame is placed on the silicone so that the silicone connects the backplate with the frame. A small gap between the frame and the rim of the backplate prevents direct transfer of forces from the backplate to the frame and improves in this manner the black uniformity of an electrooptical display mounted on the frame.

In an embodiment, if the frame fits between the rims of the backplate, the silicone is not required to go beyond the rim.

By laying the frame on the silicone dispensed on the backplate and pressing the frame in the direction of the backplate, especially in a negligible manner, the silicone might be squeezed around a rim of a light guide positioned in the backplate and adjacent to the dispensed silicone. The fixing of this light guide is thus additionally provided.

The silicone and especially the electrically conductive silicone are for example dispensed by a dispensing machine, but it is also possible to dispense the silicone manually, for example with a silicone press or other functionable tools. Even this manual dispensing is easier and less problematic with respect to incorrect assembly than the use of rubber damping elements fitted manually or by machine on the electrooptical display module.

For the mechanical connection it is advantageous if the carrier and the frame comprise respectively multiple first sectors or if the first sectors respectively extend across the frame and the carrier.

In an embodiment, as far as the carrier and the backplate comprise a second section and the respective second section of the backplate and the carrier are in direct mechanical contact with each other an easy assembly of the module may be realized since no additional tools are required for bringing the first sectors of the carrier and of the frame into the right position with respect to each other if the electrically conductive silicone is dispensed on the first sector or sectors, even if the viscosity of the silicone is not sufficiently high to hold the two parts in their positions before the silicone is set.

Even if the carrier and the backplate comprise no second sectors, the assembly of the electrooptical display module is simplified by mounting the backplate in a first holding tool and mounting the carrier in a second mounting tool and positioning the backplate and the carrier with respect to each other so that there are formed respective spaces between the respective first sectors of the frame and the respective first sectors of the carrier.

The second sectors are chosen in a manner such that, if the second sectors of the carrier are in contact with the second sectors of the frame, the respective first sectors of the carrier face the respective first sectors of the frame. An optimum number of second sectors for each of the backplate and the carrier is three since then an optimum position of the carrier and the backplate with respect to each other can be realized. If the number of second sectors is less than three, an additional adjusting tool for the right position between the frame and the carrier might be required; if the number is greater than three, the position of the frame in relation to the carrier might be over-determined and due to tolerances only respectively three of the second sectors of the frame might be in direct contact to the respective second sectors of the carrier.

Other objects, features and characteristics of the present disclosure, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The disclosure is now described by way of example with the help of the Figures, wherein.

DETAILED DESCRIPTION

Figure 1:
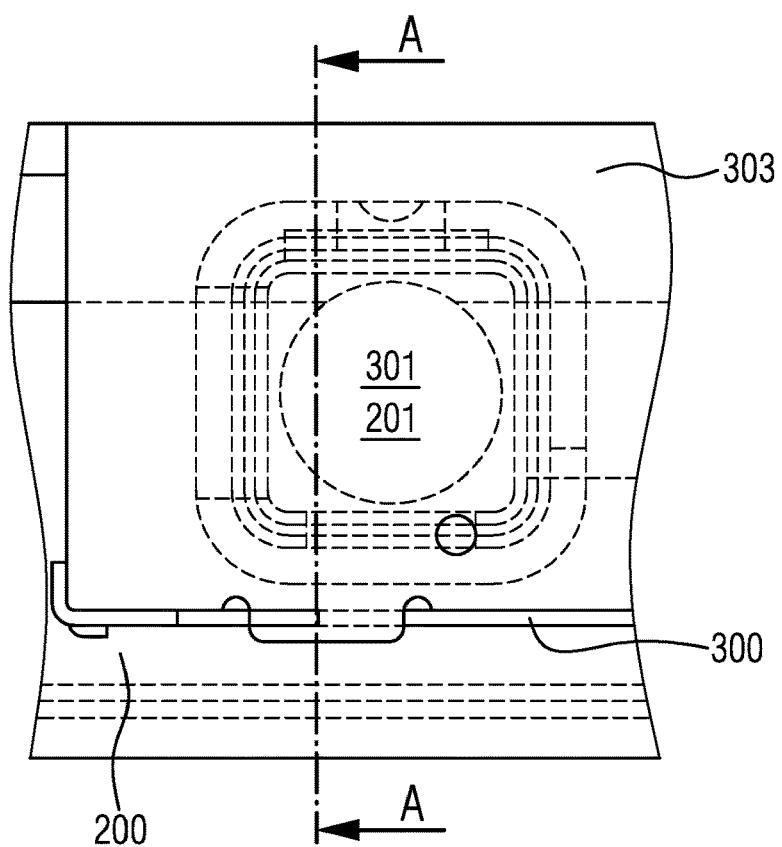
FIG. 1 shows as a first example the view in part of a rear side of one possible electrooptical display module according to one example of the disclosure.

In FIG. 1 one may see a backplate 200 of an electrooptical display 100 and a carrier 300 carrying a printed circuit board 303. The light guide 700 is arranged between the backplate 200 of the electrooptical display and the electrooptical display 100. The backplate 200 comprises a first sector 201 and the carrier 300 comprises a first sector 301. The first sectors 301, 201 of the carrier 300 or the backplate 200 match in their positions, providing by their distance to each other a space between them. The backplate 200 may be connected to the electrooptical display 100 and carry the electrooptical display 100 in the manner as described later in the second example with reference to FIGS. 3-5 or in any other manner.

Figure 2:
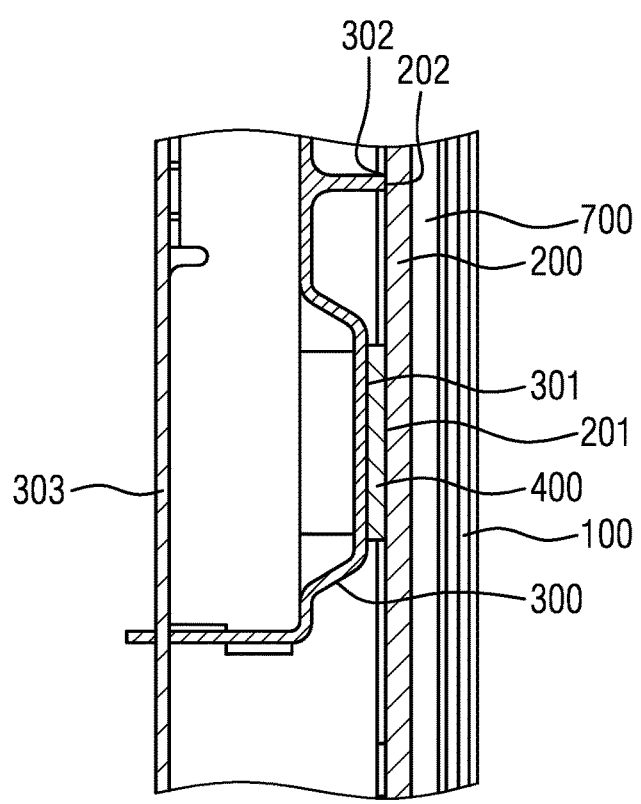
FIG. 2 shows the section A-A of FIG. 1.

In FIG. 2 one may see additionally a second sector 202 of the backplate 200, a second sector 302 of the carrier 300, an electrically conductive silicone body 400, a light guide 700 and an electrooptical display 100. The first sectors 201, 301 are parallel to each other. The second sectors 202, 302 may adjust the distance of the first sectors 201, 301 to each other in advance of the setting of the electrically conductive silicone. Thus the electrically conductive silicone may be dispensed during assembly of the display module on one or both of the first sectors 201, 301 before the carrier 300 and the backplate 200 are brought into a position as shown in FIG. 1. Without the second sectors 202, 302 the position of the backplate 200 and the carrier 300 to each other may be adjusted by tools providing the right positions of these two parts for example by holding them at the right distance from each other. According to the viscosity of the silicone, especially the electrically conductive silicone, and the weight of the carrier 300, including the printed circuit board 303, additional tools or second sectors 202, 301 are not required to hold the two elements at a desired distance from each other if the viscosity of the silicone is sufficiently high so that the silicone does not flow away before it is set.

Figure 3:
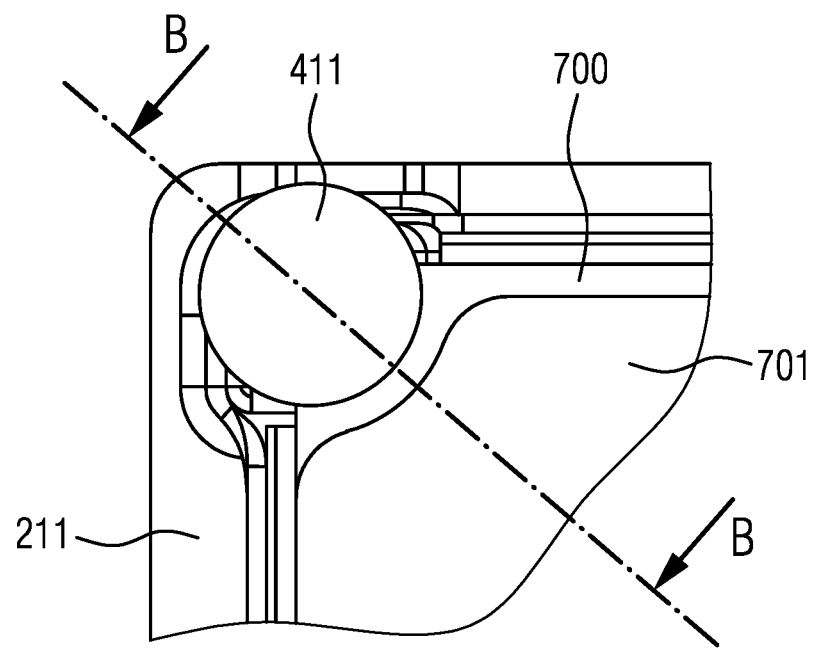
FIG. 3 shows as a second example a part view onto a backplate.

In FIG. 3 is shown a rim 211 of an otherwise not displayed sidewall (No. 210 in FIGS. 4 and 5) and backplate (No. 200 in FIGS. 4 and 5), silicone 411, a light guide 700 and a foil stack 701. The silicone 411 is dispensed and not yet set.

Figure 4:
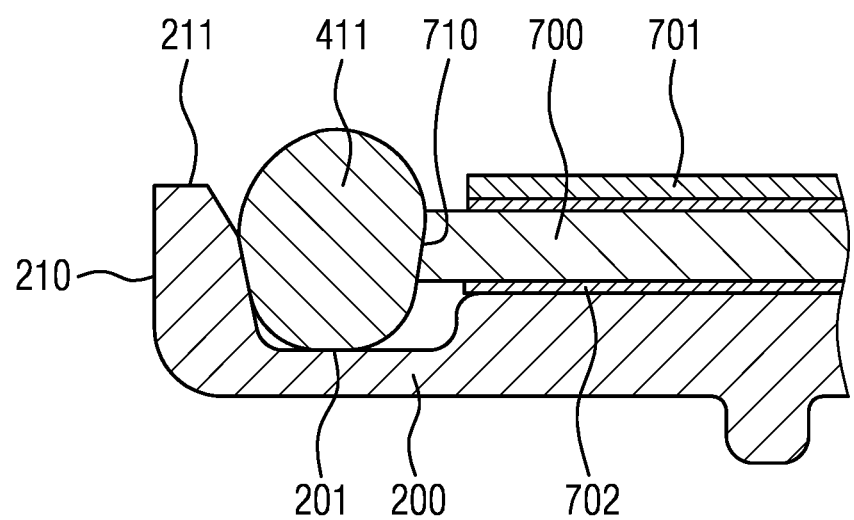
FIG. 4 shows the section B-B of FIG. 3.

In FIG. 4 are shown additionally to the parts of FIG. 3 the backplate 299 with a first sector 201, a sidewall 210 and the rim 211, the silicone 411, the light guide 700 with a rim 700, the foil stack 701 and a reflector foil 702. The silicone 411 is dispensed on the second sector 201 and goes beyond the rim 211 of the sidewall 210. The silicone 411 furthermore touches preferably as shown the sidewall 210 of the backplate 200 and the rim of 710 of the lightguide 710. The features described in the foregoing sentence are not necessarily required, these features depend on the actual design of the backplate and the lightguide 700.

Figure 5:
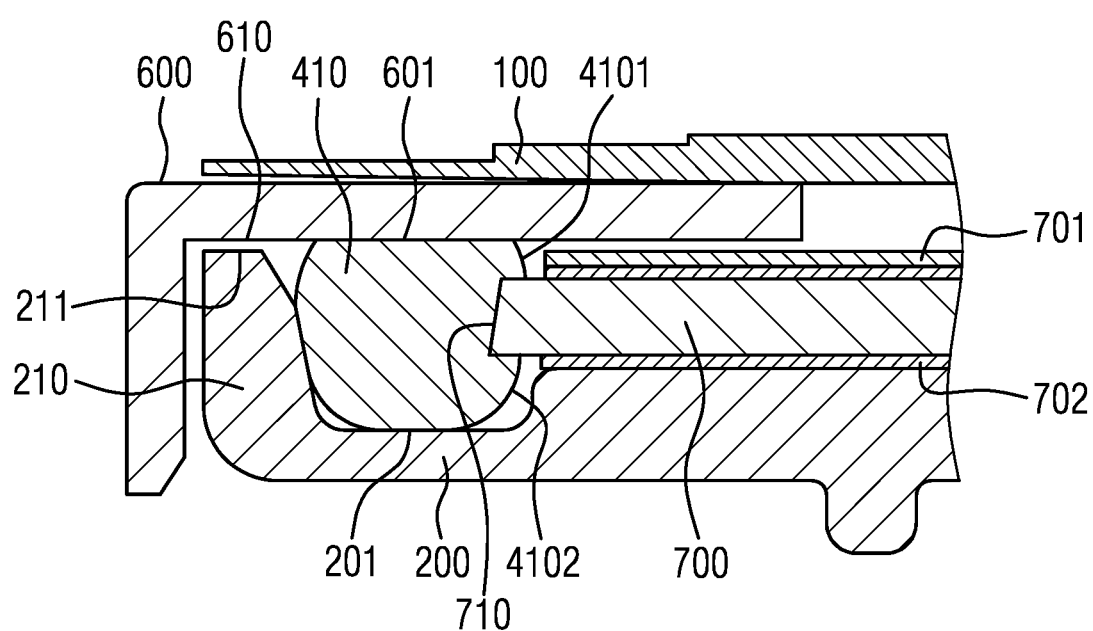
FIG. 5 shows the view of FIG. 4, additionally with a frame and a display.

FIG. 5 shows additionally to the parts shown in FIG. 4 a frame 600 with an underside 610, the underside 610 comprising a first sector 601, an electrooptical display 100 and a silicone body 410. The electrooptical display 100 is connected to the frame 600.

The silicone body 410 is created by laying the underside 610 of the frame 600 on the silicone 411 (see FIG. 4) and pressing the frame 600 and backplate 200 together so that the underside 610 of the frame 600 touches silicone 411 (FIG. 4) and the form of the shown silicone body 410 is obtained. Finally, the silicone body 410 is obtained after the silicone 411 is set. The silicone body 410 encompasses with an upper side rim 4101 and a lower side rim 4102 the rim 710 of the lightguide 700 and fixes the lightguide 700 in this manner. If less silicone 411 is used, it can be avoided if desired that the silicone 411 encompasses the rim. Furthermore, the silicone body 410 is connected with the sidewall 210 of the backplate 200. In this manner the stability of the connection between the backplate 200 and the frame 600 is further improved. Between the rim 211 of the sidewall 210 one may see a gap. In this manner torsions of the backplate 200 are transmitted to the frame 600 and the electrooptical display 100 to a lesser extent than if the backplate 200 and the frame 600 were in direct contact.

The invention claimed is:

1. An electrooptical display module, the module comprising;
    an electrooptical display; and
    a first element and a second element, wherein the first element and the second element are connected together, wherein the first element carries the electrooptical display and wherein the first element and the second element are connected by at least one silicone body, wherein the first element and the second element respectively comprise a first sector parallel to one another, the first sector of the first element and the first sector of the second element face each other and provide a space between them, the space being filled with the at least one silicone body,
    wherein the first element and the second element comprise respectively a second sector, the second sector of the first element and the second sector of the second element being in direct mechanical contact with each other, and
    wherein the respective second sectors adjust the space between the respective first sectors in advance of the setting of the at least one silicone body.

2. The electrooptical display module according to claim 1, wherein the first element and the second element are made of metal.

3. The electrooptical display module according to claim 2, wherein the at least one silicone body is made of electrically conductive silicone.

4. The electrooptical display module according to claim 3, wherein the first element is a backplate of the electrooptical display and the second element is a carrier of a printed circuit board.

5. The electrooptical display module according to claim 1, wherein the first sector of the carrier and the first sector of the backplate are planar.

6. The electrooptical display module according to claim 1, wherein the first element is a frame carrying the electrooptical display and the second element is a backplate of the electrooptical display module.

7. The electrooptical display module according to claim 6, wherein the backplate has a rectangular shape.

8. The electrooptical display module according to claim 7, wherein in each of the corners of the backplate a respective silicone body of the at least one silicon body is arranged for connecting the backplate with the frame.

9. The electrooptical display module according to claim 7, wherein the backplate comprises a channel filled with the silicone.

10. The electrooptical display module according to claim 9, wherein the channel forms a closed loop filled with the silicone.

11. The electrooptical display module according to claim 6, wherein the at least one silicone body additionally fixes a lightguide.

12. A method for producing an electrooptical display module, the method comprising:
    dispensing silicone on at least one of a first element and a second element in an amount going beyond a rim of a sidewall of the first element;
    placing a frame on the silicone so that the silicone connects the first element with the frame and the silicone body is formed;
    bringing the first element and the second element together so that the silicone connects the first element with the second element; and
    waiting until the silicone is set and so a silicone body is formed.

13. The method according to claim 12, further comprising:
    squeezing the silicone around a rim of a light guide by placing the frame on the silicone.

14. The method according to claim 12, wherein the silicon is an electrically conductive silicone.

15. A method for producing an electrooptical display module, the method comprising:
    dispensing the silicone on at least one of a first sector of the first element and a first sector of the second element, bringing the first element and the second element together so that the silicone connects the first element with the second element; and positioning the first element and the second element in a manner such that the first sector of the first element and the first sector of the second element form a space between them so that the space is filled with the silicone dispensed beforehand on at least one of the first sector of the first element and the first sector of the second element; and waiting until the silicone is set so that the silicone body is formed.

16. The method according to claim 15,
wherein the silicon is an electrically conductive silicone.

\* \* \* \* \*